United States Patent
Lee et al.

(10) Patent No.: US 10,318,091 B2
(45) Date of Patent: Jun. 11, 2019

(54) MONOLITHIC HAPTIC TOUCH SCREEN, MANUFACTURING METHOD THEREOF, AND DISPLAY DEVICE INCLUDING THE SAME

(71) Applicant: LG Display Co., Ltd., Seoul (KR)

(72) Inventors: YongWoo Lee, Goyang-si (KR); YongSu Ham, Seoul (KR)

(73) Assignee: LG Display Co., Ltd., Seoul (KR)

( * ) Notice: Subject to any disclaimer, the term of this patent is extended or adjusted under 35 U.S.C. 154(b) by 23 days.

(21) Appl. No.: 14/568,029

(22) Filed: Dec. 11, 2014

(65) Prior Publication Data

US 2015/0169118 A1 Jun. 18, 2015

(30) Foreign Application Priority Data

Dec. 13, 2013 (KR) ........................ 10-2013-0155777

(51) Int. Cl.
| | | |
|---|---|---|
| *G06F 3/047* | (2006.01) | |
| *G06F 3/01* | (2006.01) | |
| *G06F 3/041* | (2006.01) | |
| *G06F 3/044* | (2006.01) | |

(52) U.S. Cl.
CPC .............. *G06F 3/047* (2013.01); *G06F 3/016* (2013.01); *G06F 3/041* (2013.01); *G06F 3/044* (2013.01); *G06F 2203/04105* (2013.01)

(58) Field of Classification Search
CPC .......... G06F 3/047; G06F 3/041; G06F 3/044; G06F 3/016; G06F 2203/04105
See application file for complete search history.

(56) References Cited

U.S. PATENT DOCUMENTS

| | | | | |
|---|---|---|---|---|
| 7,834,527 | B2 * | 11/2010 | Alvarez Icaza Rivera | ................... H01L 41/0478 310/344 |
| 8,669,325 | B1 * | 3/2014 | Hyman | ..................... B44F 1/00 257/40 |
| 9,507,456 | B2 * | 11/2016 | Watazu | ................. G06F 3/0414 |
| 2006/0043358 | A1 * | 3/2006 | Ueda | ..................... C08G 61/12 257/40 |

(Continued)

FOREIGN PATENT DOCUMENTS

| | | |
|---|---|---|
| CN | 1175342 C | 11/2004 |
| CN | 1636163 A | 7/2005 |

(Continued)

OTHER PUBLICATIONS

Chinese First Office Action, Chinese Application No. 201410771209. 8, dated Apr. 19, 2017, 20 pages.

(Continued)

*Primary Examiner* — Nicholas J Lee
*Assistant Examiner* — Gerald L Oliver
(74) *Attorney, Agent, or Firm* — Fenwick & West LLP

(57) ABSTRACT

A monolithic haptic-type touch screen capable of performing both touch recognition and haptic feedback are provided. The monolithic haptic-type touch screen includes an insulating film formed by doping ferroelectric material in an electroactive polymer (EAP), an upper electrode formed on an upper surface of the insulating film, and a lower electrode formed on a lower surface of the insulating film and corresponding to the upper electrode.

25 Claims, 4 Drawing Sheets

(56) References Cited

U.S. PATENT DOCUMENTS

| | | | |
|---|---|---|---|
| 2006/0138574 A1* | 6/2006 | Saito | G01L 1/146 257/417 |
| 2006/0250534 A1 | 11/2006 | Kutscher et al. | |
| 2010/0045310 A1* | 2/2010 | Betancourt | G06F 3/044 324/686 |
| 2010/0148632 A1* | 6/2010 | Boersma | C08K 5/0016 310/328 |
| 2010/0182250 A1* | 7/2010 | Kang | G06F 3/044 345/173 |
| 2011/0151153 A1 | 6/2011 | Felder et al. | |
| 2012/0126959 A1* | 5/2012 | Zarrabi | B06B 1/0688 340/407.1 |
| 2012/0133622 A1 | 5/2012 | Brokken et al. | |
| 2012/0229400 A1 | 9/2012 | Birnbaum et al. | |
| 2012/0257772 A1* | 10/2012 | Onishi | H04R 17/00 381/190 |
| 2012/0306790 A1* | 12/2012 | Kyung | G06F 3/016 345/173 |
| 2013/0044049 A1 | 2/2013 | Biggs et al. | |
| 2013/0147728 A1 | 6/2013 | Lee et al. | |
| 2013/0157729 A1 | 6/2013 | Tabe | |
| 2013/0307789 A1 | 11/2013 | Karamath et al. | |
| 2015/0116231 A1* | 4/2015 | Kim | G06F 3/016 345/173 |
| 2016/0018893 A1* | 1/2016 | Choi | G06F 3/016 345/177 |

FOREIGN PATENT DOCUMENTS

| | | | |
|---|---|---|---|
| CN | 1860432 A | 11/2006 | |
| CN | 1898815 A | 1/2007 | |
| CN | 102187747 A | 9/2011 | |
| CN | 103069365 A | 4/2013 | |
| EP | 2 605 111 A2 | 6/2013 | |
| JP | 2006-065456 A | 3/2006 | |
| JP | 2009020006 A * | 1/2009 | G01L 1/14 |
| JP | 2009-271721 A | 11/2009 | |
| JP | 2010-271830 A | 12/2010 | |
| TW | 200504602 A | 2/2005 | |
| TW | 200527726 A | 8/2005 | |
| TW | 201029020 | 8/2010 | |
| TW | 201134661 A | 10/2011 | |
| TW | 201209667 A | 3/2012 | |
| WO | WO 2013/161867 A1 | 10/2013 | |

OTHER PUBLICATIONS

Taiwan Intellectual Property Office, Office Action, Taiwan Patent Application No. 103143579, dated Nov. 17, 2015, twenty-one pages.

European Patent Office, Search Report and Opinion, European Patent Application No. 14197453.5, dated May 26, 2015, eight pages.

* cited by examiner

MONOLITHIC HAPTIC TOUCH SCREEN, MANUFACTURING METHOD THEREOF, AND DISPLAY DEVICE INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2013-0155777, filed on Dec. 13, 2013, the contents of which is incorporated by reference herein in its entirety.

BACKGROUND

1. Technical Field

The present disclosure relates to a touch screen and, more particularly, to a monolithic haptic-type touch screen integrating a touch function and a haptic function, a manufacturing method thereof, and a display device including the same.

2. Background

A touch screen is an input device for recognizing a particular position when a user's hand or an object touches the particular position, and executing a particular function, without using an input device such as a keyboard or a mouse.

Touch screens are used in various display devices, for example, electronic products having various screen sizes, such as an automated teller (ATM) machine of a bank, a personal digital assistant (PDA), a portable multimedia player (PMP), a touch pad of a notebook computer, a navigation device, and the like, as well as a cellular phone.

Recently, beyond providing mere touch and direct manipulation functionality, haptic functionality has been added to the touch screen to provide touch sensation to users. Haptic technology is technology that allows users to feel the sense of touch, a force, a motion, and the like.

A haptic function is implemented together with a touch screen in a display device, and when a user touches a touch screen as an input device, the haptic function may provide a tactile feedback to the user through vibrations, or the like.

FIG. 1 is a view illustrating a structure of a related art display device including a touch screen and a haptic device.

Referring to FIG. 1, a related art display device 1 includes a cover glass 3, a touch screen 4, a display panel 2, and a haptic feedback unit 5.

The display panel 2 is a part where an image is substantially displayed, and an organic light emitting panel, a plasma panel, and the like, is used as the display panel 2.

The touch screen is positioned above the display panel 2 and senses a touch input applied by a user through the cover glass 3.

The touch screen 4 includes an insulating film 4b, and an upper electrode 4a and a lower electrode 4c respectively formed above and below the insulating film 4b.

When the user applies a touch input through the cover glass 3, the touch screen 4 recognizes the touch input by capacitance generated between the upper electrode 4a and the lower electrode 4c, and performs a corresponding operation.

The cover glass 3 is positioned above the touch screen 4 to protect the touch screen 4 and the display panel 2. The cover glass 3 is formed as tempered glass having a predetermined thickness.

The haptic feedback unit 5 is positioned below the display panel 2 and provides a haptic feedback such as vibrations or the like, to the user.

The haptic feedback unit 5 operates together with the touch screen 4, and thus, when the user touches the touch screen 4, the haptic feedback unit 5 provides a haptic feedback to the user. The haptic feedback unit 5 is configured as a vibration motor or formed of piezoelectric ceramic.

Here, since the related art display device 1 having the foregoing configuration is configured to include the touch screen 4 and the haptic feedback unit 5, an overall thickness of the display device 1 increases.

Also, since the haptic feedback unit 5 is positioned in the lowermost portion, namely, below the display panel 2, haptics such as vibrations generated by the haptic feedback unit 5 may not properly be delivered to the user.

For example, in a case in which the haptic feedback unit 5 is configured as a vibration motor, it may be difficult to promptly provide a haptic feedback to the user due to a low response speed of the vibration motor, and in order to deliver uniform vibrations to the front surface of the display device, a large number of vibration motors should be used, which results in an increase in the thickness and size of the display device 1.

Also, in a case in which the haptic feedback unit 5 is formed of piezoelectric ceramic, a response speed may be enhanced, compared with the vibration motor, but manufacturing cost of the display device 1 increases due to high-priced piezoelectric ceramic. In addition, due to opaque characteristics of piezoelectric ceramic, the haptic feedback unit 5 needs to be disposed in the lowermost portion of the display panel 2, like the vibration motor, and thus, it is challenging to accurately deliver a haptic feedback to the user.

SUMMARY

Therefore, an aspect of the detailed description is to provide a monolithic haptic-type touch screen capable of performing both a touch recognition and providing a haptic feedback, a manufacturing method thereof, and a display device including the monolithic haptic-type touch screen.

To achieve these and other advantages and in accordance with the purpose of this specification, as embodied and broadly described herein, a monolithic haptic-type touch screen may include: an insulating film including doped ferroelectric material in an electroactive polymer (EAP); an upper electrode formed on an upper surface of the insulating film; and a lower electrode formed on a lower surface of the insulating film and corresponding to the upper electrode. The upper electrode and the lower electrode operate as electrodes for both touch recognition and haptic feedback.

To achieve these and other advantages and in accordance with the purpose of this specification, as embodied and broadly described herein, a method for manufacturing a monolithic haptic-type touch screen may include: immersing a ferroelectric material in a liquid polymer to form an insulating film; forming an upper electrode on an upper surface of the insulating film; and forming a lower electrode, which corresponds to the upper electrode, on a lower surface of the insulating film.

According to one or more embodiments, a display device comprises a display panel configured to display an image and a haptic touch-sensitive structure. The haptic touch-sensitive structure comprises a first electrode disposed proximal to a user-facing side of the display device, a second electrode disposed distal to the user-facing side of the device, and an insulating film formed between the first electrode and the second electrode. In some embodiments, the haptic touch-sensitive structure is configured to generate a touch signal responsive to a touch input from a user detected by the first electrode and the second electrode and the haptic touch-sensitive structure is further configured to generate a haptic output responsive to a vibration signal applied to the first electrode and the second electrode. In some embodiments, the haptic touch-sensitive structure is configured to generate the haptic output at a location of the touch input, responsive to the vibration signal including the location of the touch input applied to the first electrode and the second electrode.

According to embodiments of the present disclosure, the monolithic haptic-type touch screen, the manufacturing method thereof, and the display device including the same, since the monolithic haptic-type touch screen capable of performing both touch recognition and haptic feedback is manufactured by using an electroactive polymer (EAP), an overall thickness of a display device configured to execute a touch and haptic function by including the monolithic haptic-type touch screen can be reduced, and thus, manufacturing cost can be reduced.

Also, since the monolithic haptic-type touch screen is positioned above a display panel, an accurate and prompt haptic feedback may be provided to a user.

In addition, since a haptic feedback is selectively provided limitedly for a user's touch point, rather than the entire region of the touch screen, various haptic outputs can be provided to a user.

Further scope of applicability of the present application will become more apparent from the detailed description given hereinafter. However, it should be understood that the detailed description and specific examples, while indicating preferred embodiments, are given by way of illustration only, since various changes and modifications within the spirit and scope will become apparent to those skilled in the art from the detailed description.

BRIEF DESCRIPTION OF THE DRAWINGS

The accompanying drawings, which are included to provide a further understanding and are incorporated in and constitute a part of this specification, illustrate exemplary embodiments and together with the description serve to explain the principles.

In the drawings.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a monolithic haptic-type touch screen, a manufacturing method thereof, and a display device including the same according to embodiments of the present disclosure will be described with reference to the accompanying drawings.

Figure 1:
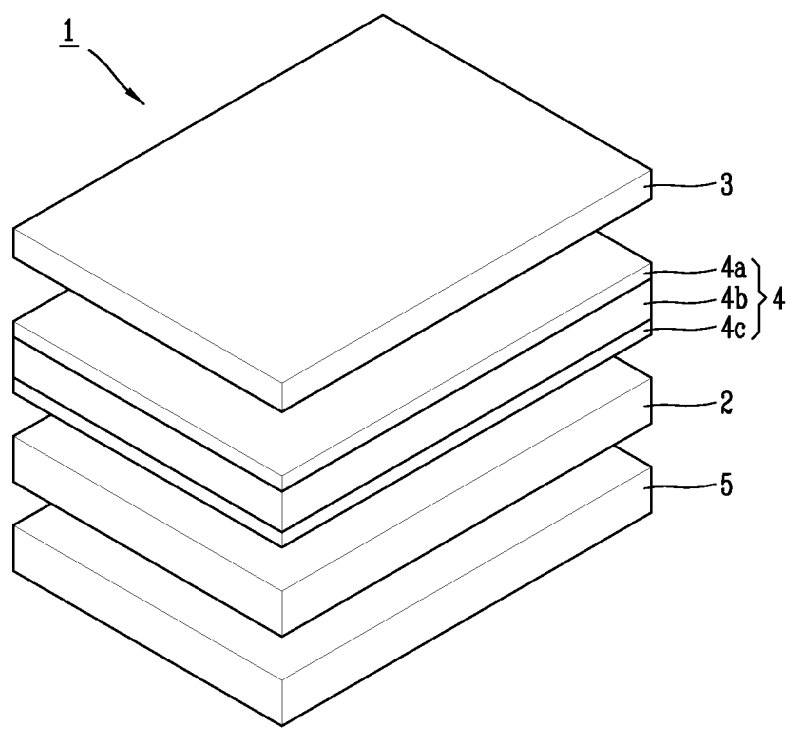
FIG. 1 is view illustrating a structure of the related art display device including a touch screen and a haptic device.
Figure 2:
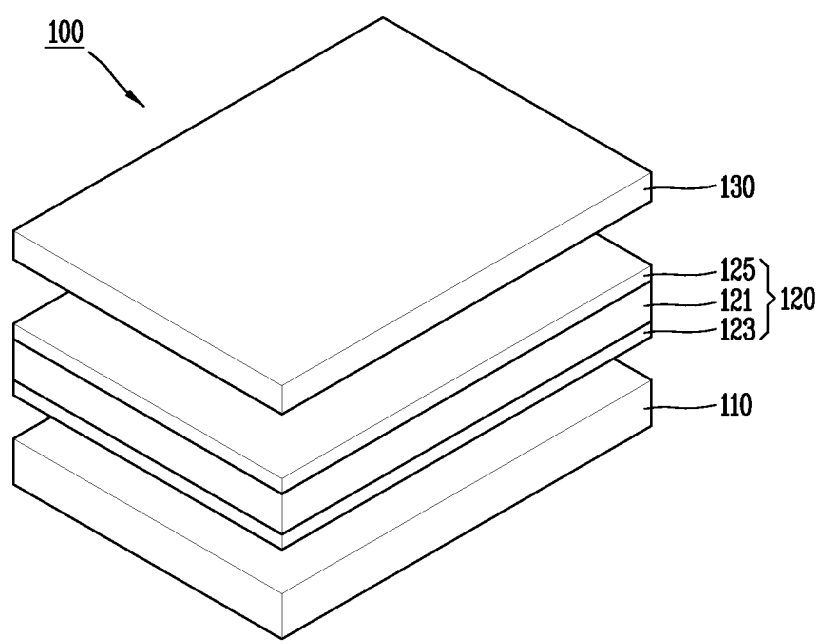
FIG. 2 is a view illustrating a structure of a display device including a monolithic haptic-type touch screen according to an embodiment of the present disclosure.

FIG. 2 is a view illustrating a structure of a display device including a monolithic haptic-type touch screen according to an embodiment of the present disclosure.

Referring to FIG. 2, a display device 100 according to the present embodiment may include a protective cover 130, a monolithic haptic-type touch screen 120, and a display panel 110.

The display panel 110 is a part where an image is substantially displayed, and a liquid crystal panel, an organic light emitting panel, a plasma panel, and the like, may be used as the display panel 110, but the present disclosure is not limited thereto. An image displayed on the display panel 110 may be provided to a user through the monolithic haptic-type touch screen 120 and the protective cover 130.

The monolithic haptic-type touch screen 120 may be disposed on the display panel 110. The monolithic haptic-type touch screen 120 may include a transparent insulating film and transparent electrodes, namely, an upper electrode 125 and a lower electrode 123, respectively disposed on upper and lower surfaces of the insulating film 121.

The insulating film 121 may be formed by using an electroactive polymer (EAP) material.

The EAP material may have a structure in which an electrode, a polymer, and an electrode are vertically arranged in this order, and may generate vibrations according to a signal, for example, a voltage, applied from the outside.

For example, the insulating film 121 formed of an EAP material may continuously contract and expand according to a voltage applied thereto to stably generate vibrations, and since the insulating film 121 has a high response speed, it may generate vibrations having various frequency bands.

As the EAP, dielectric elastomer such as silicone, acryl, urethane, and the like, may be used. The dielectric elastomer may have high transparency and elasticity.

However, the foregoing dielectric elastomer requires a relatively high voltage and is excessively deformed due to a low Young's modulus thereof, having low durability. Thus, the insulating film 121 according to the present embodiment may be formed by doping a material having a high Young's modulus and ferroelectricity characteristics in an EAP.

Since the insulating film 121 is formed by doping a material having a high Young's modulus and ferroelectricity in an EAP, the insulating film 121 requires a low driving voltage and has enhanced durability, compared with the related art insulating film formed using an EAP, or the like.

Here, the insulating film 121 may be formed to have a thickness ranging from about 50 μm to 200 μm, and a voltage applied to the insulating film 121 may be in inverse proportion to a thickness of the insulating film 121.

Also, the insulating film 121 may have high transmittance equal to or greater than 85%, Young's modulus ranging from about 300 to 700, and strain of 5% or less.

The upper electrodes 125 and the lower electrode 123 may be positioned on upper and lower surfaces of the insulating film 121.

The upper electrode 125 and the lower electrode 123 may operate as an electrode of a touch sensor sensing a touch input applied by the user and an electrode of a haptic actuator providing a haptic feedback to the user.

For example, when the user performs a touch operation on an upper surface of the protective cover 130, capacitance in the upper electrode 125 and the lower electrode 123 with the insulating film 121 interposed therebetween is changed in the portion touched by the user. The display device 100 senses the change in capacitance to recognize the user's touch.

Also, in order to provide a haptic feedback, for example, vibrations, to the user, a predetermined voltage may be applied to the upper electrode 125 and the lower electrode 123. Accordingly, the insulating film 121 may generate vibrations by the voltage applied to the upper electrode 125 and the lower electrode 123, and the generated vibrations may be provided to the user through the protective cover 130.

In consideration of the fact that the monolithic haptic-type touch screen 120 is disposed on the display panel 110, the upper electrode 125 and the lower electrode 123 may be formed of a transparent material, for example, indium tin oxide (ITO) or indium zinc oxide (IZO).

However, in consideration of the fact that the upper electrode 125 and the lower electrode 123 operate as electrodes for a haptic feedback, the upper electrode 125 and the lower electrode 123 may be formed of a transparent electrode material resistant to vibrations, such as carbon nanotube (CNT), an organic conductive polymer (PEDOT/PSS), graphene, a silver nanowire, or metal mesh.

The protective cover 130 may be disposed on the monolithic haptic-type touch screen 120. The protective cover 130 may protect the touch screen 120 and the display panel 110.

Also, the protective cover 130 may operate as a medium delivering vibrations generated in the monolithic haptic-type touch screen 120 to the user. In other words, the protective cover 130 may amplify vibrations generated in the monolithic haptic-type touch screen 120 toward the user.

Meanwhile, the protective cover 130 may be formed of tempered glass, or the like. However, in consideration of the fact that the monolithic haptic-type touch screen 120 provides localized vibrations to the user, the protective cover 130 may be formed of transparent plastic such as polymethacrylate, polycarbonate, and the like.

Meanwhile, although not shown, an insulating sheet (not shown) formed of an insulating material may be disposed between the monolithic haptic-type touch screen 120 and the display panel 110.

The insulating sheet may prevent malfunction of the display panel 110 due to a high voltage generated when the monolithic haptic-type touch screen 120 performs a touch and haptic operation. Also, according to circumstances, a conductive sheet, instead of an insulating sheet, may be disposed, and in this case, the conductive sheet may be connected to a ground GND.

Hereinafter, a method for manufacturing the monolithic haptic-type touch screen according to an embodiment of the present disclosure will be described in detail.

Figure 3:
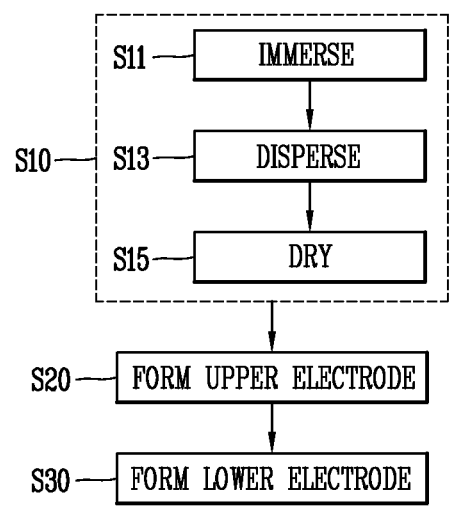
FIG. 3 is a flow chart illustrating a process of a method for manufacturing a monolithic haptic-type touch screen.

FIG. 3 is a flow chart illustrating a process of a method for manufacturing the monolithic haptic-type touch screen illustrated in FIG. 2.

Referring to FIGS. 2 and 3, the method for manufacturing a monolithic haptic-type touch screen according to the present embodiment may include an insulating film manufacturing step (S10), an upper electrode forming step (S20), and a lower electrode forming step (S30).

Also, the insulating film manufacturing step (S10) may include sub-steps of immersing (S11), dispersing (S13), and drying (S15).

First, a ferroelectric material may be immersed in a liquid EAP, namely, a liquid polymer matrix (S11).

The ferroelectric material may be a material having high permittivity, and a ceramic compound may be used as the ferroelectric material. For example, the ferroelectric material may be a ceramic compound having a perovskite structure such as barium titanate (BaTiO3), lead titanate (PbTiO3), lead zirconate (PbZrO3), or niobium potassium oxide (KNbO3) having high permittivity characteristics.

The ferroelectric material may be immersed in an amount of about 1.0 wt % to 4.5 wt % in a liquid polymer. If the ferroelectric material is immersed by less than 1.0 wt %, it may be difficult to obtain an effect of requiring a low driving voltage due to high permittivity, and if the ferroelectric material is immersed in excess of 4.0 wt %, transmissivity may be reduced.

Also, the ferroelectric material may be immersed in the form of powder in a liquid polymer. In this case, particles of the ferroelectric material may have a size ranging from 50 to 150 nm. If a size of the particle of ferroelectric powder is less than 50 nm, considerable particle aggregation occurs, and thus, ferroelectric powder is not properly mixed with the liquid polymer, and if a size of the particle of ferroelectric powder exceeds 150 nm, transmissivity is reduced due to opaqueness of particle.

Subsequently, the immersed ferroelectric material may be dispersed in a liquid polymer (S13). For example, the after the ferroelectric material is immersed, the ferroelectric material may be dispersed in the polymer matrix by using a high-speed rotary machine or an extractor.

Subsequently, liquid polymer in which the ferroelectric material is dispersed may be left at room temperature for a predetermined time and dried to form the insulating film 121 (S15).

Here, the liquid polymer may be left for about two to four hours at room temperature. Also, the liquid polymer may be dried for more than four hours at a temperature ranging from 100° C. to 200° C. to form the insulating film 121.

After the insulating film 121 is formed, the upper electrode 125 may be formed on an upper surface of the insulating film 121 (S20). Also, the lower electrode 123 is formed on a lower surface of the insulating film 121, thus manufacturing the monolithic haptic-type touch screen 120 (S30).

Meanwhile, the upper electrode 125 and the lower electrode 123 may be formed in various shapes on the upper and lower surfaces of the insulating film 121, respectively.

For example, the upper electrode 125 and the lower electrode 123 may be formed in a flat shape, a bar shape, or a checkerboard shape including a plurality of sub-electrodes on the upper and lower surfaces of the insulating film 121, respectively.

Figure 4:
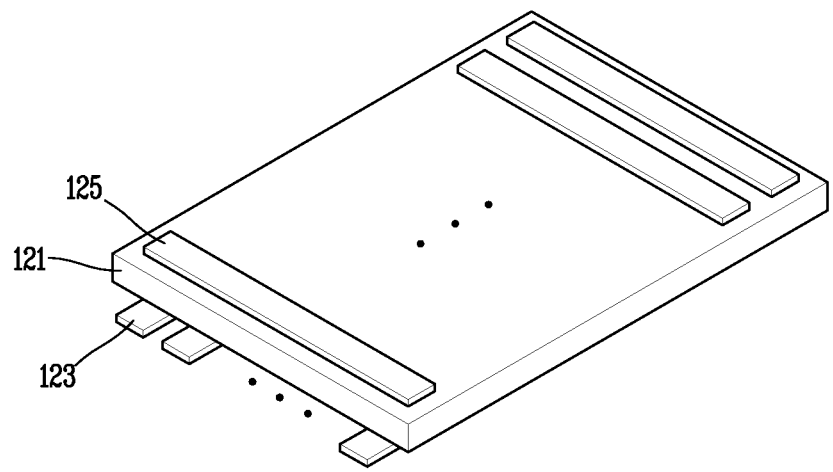
FIG. 4 is a view illustrating an electric structure of the monolithic haptic-type touch screen according to an embodiment of the present disclosure.
Figure 5:
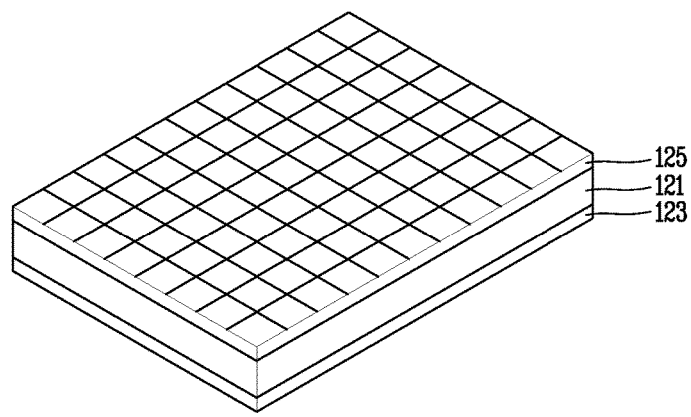
FIG. 5 is a view illustrating an electric structure of the monolithic haptic-type touch screen according to another embodiment of the present disclosure.

FIG. 4 is a view illustrating an electric structure of the monolithic haptic-type touch screen according to an embodiment of the present disclosure, and FIG. 5 is a view illustrating an electric structure of the monolithic haptic-type touch screen according to another embodiment of the present disclosure.

Referring to FIG. 4, a plurality of upper electrode 125 may be arranged in one direction on the upper surface of the insulating film 121, having a bar shape.

Also, a plurality of lower electrodes 123 may be arranged in the other direction on the lower surface of the insulating film 121 such that the lower electrodes 123 correspond to the upper electrodes 125. Here, the upper electrodes 125 and the lower electrodes 123 may cross each other in the arrangement directions.

As capacitance is changed in an intersection of the upper electrode 125 and the lower electrode 123 according to a user's touch, the user's touch input may be recognized.

The upper electrode 125 and the lower electrode 123 may be provided with a predetermined voltage from the outside such that the insulating film 121 vibrates at the recognition point.

The upper electrode 125 and the lower electrode 123 may be formed by depositing an electrode material on the upper and lower surfaces and patterning the same, respectively.

Meanwhile, in order to more precisely recognize a touch and provide a haptic feedback, the upper electrode 125 and the lower electrode 123 may have a checkerboard structure including a plurality of sub-electrodes.

Referring to FIG. 5, the upper electrode 125 may have a checkerboard shape including a plurality of sub-electrodes on the upper surface of the insulating film 121. Here, the plurality of sub-electrodes of the upper electrode 125 may be individually connected to an external circuit, for example, a touch and haptic control circuit.

The lower electrode 123 may be formed to have a flat shape on the lower surface of the insulating film 121. However, the present disclosure is not limited thereto and the lower electrode 123 may also have a checkerboard shape identical to that of the upper electrode 125.

The upper electrode 125 and the lower electrode 123 as described above may cause capacitance to be changed in an intersection thereof by a user's touch, whereby the user's touch input can be recognized.

The upper electrode 125 and the lower electrode 123 may be provided with a predetermined voltage such that the insulating film 121 vibrates at the recognition point.

In this case, since the upper electrode 125 includes a plurality of sub-electrodes, the user's touch input may be more accurately recognized and a corresponding haptic feedback may be provided, relative to the upper electrode 125 described above with reference to FIG. 4.

The upper electrode 125 and the lower electrode 123 may be formed by depositing an electrode material on upper and lower surfaces of the insulating film 121 and pattering the same, respectively.

Figure 6:
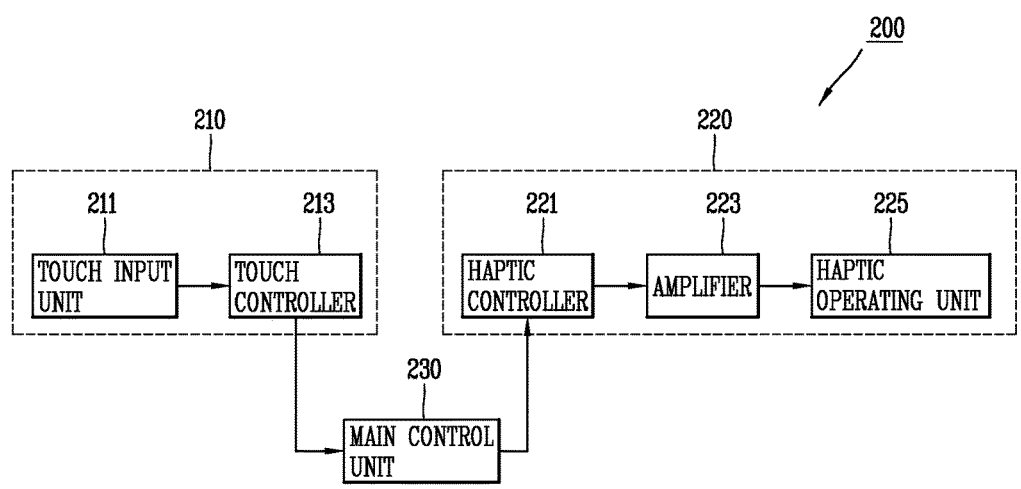
FIG. 6 is a view illustrating a driving unit of the display device including the monolithic haptic-type touch screen illustrated in FIG. 2.

FIG. 6 is a view illustrating a driving unit of the display device including the monolithic haptic-type touch screen illustrated in FIG. 2.

Referring to FIGS. 2 and 6, a driving unit 200 of the display device 100 may include a touch control unit 210, a haptic control unit 220, and a main control unit 230.

Here, the touch control unit 210 may include a touch input unit 211 and a touch controller 213. Also, the haptic control unit 220 may include a haptic controller 221, an amplifier 223, and a haptic operating unit 225.

The touch control unit 210 may sense a touch input of the user and control the display panel 110 of the display device 100 to perform a corresponding operation.

In some embodiments, the touch input unit 211 may sense a user's touch input, and the touch controller 213 may generate touch coordinates of the user and a corresponding command according to the sensing result.

For example, the user may touch a predetermined icon on a screen visible through the protective cover 130 of the display device 100, namely, on a screen displayed on the display panel 110.

The touch input unit 211 may sense the user's touch input through a change in capacitance of the monolithic haptic-type touch screen 120. The touch input unit 211 may output the sensing result to the touch controller 213.

The touch controller 213 may generate touch coordinates of the user, namely, a position of the icon on the screen of the display panel 110 and a command signal to be performed by the icon according to the sensing results output from the touch input unit 211. The touch controller 213 may output the touch coordinates and the command, as a touch signal, to the main control unit 230.

According to the touch signal output from the touch controller 213, the main control unit 230 may process the corresponding command and control the display unit 110 to display the processing result to allow the user to recognize it.

At the same time, in order to provide a haptic feedback, the main control unit 230 may generate a predetermined haptic signal and output the generated haptic signal to the haptic control unit 220. The haptic signal may include the touch coordinates of the user included in the touch signal which has been provided from the touch control unit 210.

The haptic control unit 220 may generate a signal, namely, a vibration signal, for providing a haptic feedback for the user. The vibration signal may include the touch coordinates of the user and a predetermined voltage, for example, a voltage for using the monolithic haptic-type touch screen 120 as a haptic actuator.

The voltage signal of the vibration signal output from the haptic control unit 220 may be amplified by the amplifier 223. This is because, a high voltage, for example, a voltage ranging from 500 to 700V, needs to be applied to the upper electrode 125 and the lower electrode 123 of the monolithic haptic-type touch screen 120 for the haptic feedback operation.

Subsequently, the voltage signal amplified by the amplifier 223 according to the touch coordinates of the vibration signal may be output to the upper electrode 125 and the lower electrode 123 of the monolithic haptic-type touch screen 120.

Accordingly, vibrations are generated in a portion of the insulating film 121 of the monolithic haptic-type touch screen 120 corresponding to the upper electrode 125 and the lower electrode 123 to which the voltage signal has been applied, and the vibrations may be provided as a haptic feedback for the user through the protective cover 130.

Here, the haptic feedback operation of the monolithic haptic-type touch screen 120 may be performed immediately when the touch sensing operation is finished, namely, almost simultaneously with the touch sensing operation.

The monolithic haptic-type touch screen 120 may vibrate with strength ranging from about 0.5 to 1.0G, and a frequency when the monolithic haptic-type touch screen 120 vibrations may range from about 10 to 400 Hz.

Meanwhile, when the upper electrode 125 of the monolithic haptic-type touch screen 120 has a checkerboard structure including a plurality of sub-electrodes as illustrated in FIG. 5, a touch input may be more precisely sensed and a more accurate haptic feedback may be provided.

For example, when the upper electrode 125 includes a plurality of individually operating sub-electrodes, the touch control unit 210 may more precisely sense touch coordinates of the user by the plurality of sub-electrodes. The haptic control unit 220 may allow the insulating film to vibrate at the touch coordinates sensed by the touch control unit 210, providing selective vibrations for the user.

Figure 7:
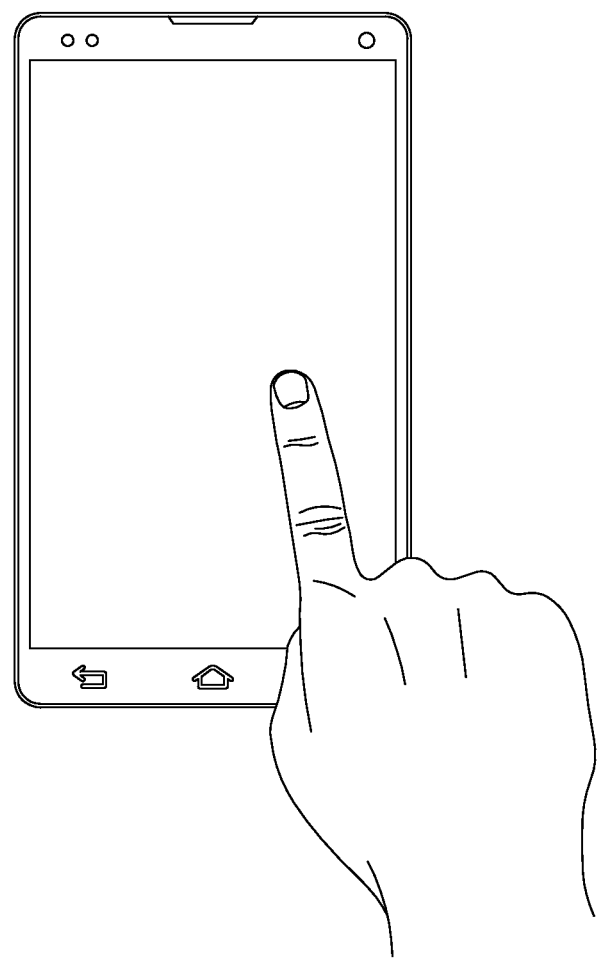
FIG. 7 is a view illustrating a display device including a monolithic haptic-type touch screen.

FIG. 7 is a view illustrating a display device including a monolithic haptic-type touch screen.

As illustrated in FIG. 7, since the display device according to the present disclosure includes a monolithic haptic-type touch screen, the display device has a small thickness. Also, since the display device according to the present disclosure does not use a haptic device such as a vibration motor, or the like, the display device according to the present disclosure is light in weight and has high transparency.

Thus, the display device including a monolithic haptic-type touch screen according to the present disclosure may be used as a display of a portable device such as a smartphone, a PDA, a navigation device, a tablet, or the like.

As described above, the monolithic haptic-type touch screen may operate as a touch sensor when the user applies a touch input, and may be used as a haptic actuator when it provides a haptic feedback, namely, vibrations, for the user.

Also, since the monolithic haptic-type touch screen has high transparency, it may be disposed above the display panel, thus providing a prompt and accurate haptic feedback for the user.

In addition, the monolithic haptic-type touch screen may provide vibrations for the user through the entire region thereof or may selectively provide vibrations only in a user's touch portion.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A monolithic haptic-type touch screen comprising:
an insulating film including doped ferroelectric material in an electroactive polymer (EAP);
an upper electrode disposed on an upper surface of the insulating film; and
a lower electrode disposed on a lower surface of the insulating film and corresponding to the upper electrode,
wherein the upper electrode and the lower electrode, responsive to a touch input on the monolithic haptic-type touch screen, generates a signal indicative of a location of the touch input on the monolithic haptic-type touch screen based on a change in capacitance between the lower electrode, the insulating film, and the upper electrode before and after the touch input, and
wherein the upper electrode and the lower electrode, responsive to receiving a vibration signal, generates a haptic output of vibrations by causing the insulating film to repeatedly contract and expand responsive to the vibration signal.

2. The monolithic haptic-type touch screen of claim 1, wherein the EAP is one selected from a group consisting of dielectric elastomers of silicon, acryl, and urethane.

3. The monolithic haptic-type touch screen of claim 1, wherein the ferroelectric material is one selected from a ceramic compound group consisting of barium titanate, lead titanate, lead zirconate, and niobium potassium oxide.

4. The monolithic haptic-type touch screen of claim 1, wherein a thickness of the insulating film ranges from 50 μm to 200 μm.

5. The monolithic haptic-type touch screen of claim 1, wherein the upper electrode and the lower electrode include one selected from a group consisting of carbon nanotube (CNT), an organic conductive polymer, graphene, silver nanowire, and metal mesh.

6. The monolithic haptic-type touch screen of claim 1, wherein the vibration signal comprises a voltage signal.

7. The monolithic haptic-type touch screen of claim 6, wherein the haptic output of vibrations is generated after a touch sensing operation.

8. The monolithic haptic-type touch screen of claim 1, wherein the signal indicative of the location of the touch input is provided to a touch controller.

9. A display device comprising:
a display panel configured to display an image;
a monolithic haptic-type touch screen disposed on the display panel and configured to recognize a user's touch and provide a haptic feedback to the user, the monolithic haptic-type touch screen including:
an insulating film composed of doped ferroelectric material in an electroactive polymer (EAP),
an upper electrode disposed on an upper surface of the insulating film, and
a lower electrode disposed on a lower surface of the insulating film and corresponding to the upper electrode,
wherein the upper electrode and the lower electrode, responsive to the user's touch, generates a signal indicative of a location of the user's touch based on a change in capacitance between the lower electrode, the insulating film, and the upper electrode before and after the user's touch, and
wherein the upper electrode and the lower electrode, responsive to receiving a vibration signal, generates a haptic output of vibrations by causing the insulating film to repeatedly contract and expand responsive to the vibration signal; and
a protective cover disposed on the monolithic haptic-type touch screen.

10. The display device of claim 9, wherein the protective cover includes transparent plastic of polymethacrylate or polycarbonate.

11. The display device of claim 9, further comprising:
an insulating sheet disposed between the monolithic haptic-type touch screen and the display panel.

12. The display device of claim 9, wherein the vibration signal comprises a voltage signal.

13. The display device of claim 12, wherein the haptic output of vibrations is generated after a touch sensing operation.

14. The display device of claim 9, wherein the signal indicative of the location of the touch input is provided to a touch controller.

15. A display device comprising:
a display panel configured to display an image; and
a haptic touch-sensitive structure including:

a first electrode disposed proximal to a user-facing side of the display device;

a second electrode disposed distal to the user-facing side of the device; and an insulating film formed between the first electrode and the second electrode, wherein the haptic touch-sensitive structure, responsive to a touch input on a monolithic haptic-type touch screen, is configured to generate a touch signal indicative of a location of the touch input on the monolithic haptic-type touch screen based on a change in capacitance between the first electrode, the insulating film, and the second electrode before and after the touch input, and wherein the haptic touch-sensitive structure, responsive to applying a vibration signal to the first electrode and the second electrode, is further configured to generate a haptic output of vibrations by causing the insulating film to repeatedly contract and expand responsive to the vibration signal.

16. The display device of claim 15, wherein the haptic touch-sensitive structure is configured to generate the haptic output at the location of the touch input, responsive to the vibration signal including the location of the touch input applied to the first electrode and the second electrode.

17. The display device of claim 15, wherein the insulating film includes doped ferroelectric material in an electroactive polymer (EAP), and the vibration signal is a voltage signal applied to both the first electrode and the second electrode to generate the haptic output.

18. The display device of claim 17, wherein the insulating film is substantially transparent to visible light.

19. The display device of claim 17, wherein the EAP is one selected from a group consisting of dielectric elastomers of silicon, acryl, and urethane.

20. The display device of claim 17, wherein the ferroelectric material is one selected from a ceramic compound group consisting of barium titanate, lead titanate, lead zirconate, and niobium potassium oxide.

21. The display device of claim 17, wherein a thickness of the insulating film ranges from 50 μm to 200 μm.

22. The display device of claim 17, wherein the first electrode and the second electrode include one selected from a group consisting of carbon nanotube (CNT), an organic conductive polymer, graphene, silver nanowire, and metal mesh.

23. The display device of claim 15, wherein the vibration signal comprises a voltage signal.

24. The display device of claim 23, wherein the haptic output of vibrations is generated after a touch sensing operation.

25. The display device of claim 15, wherein the touch signal is generated by a touch controller.

* * * * *